United States Patent [19]

Merser et al.

[11] Patent Number: 5,552,095
[45] Date of Patent: Sep. 3, 1996

[54] METHOD OF FORMING STRUCTURAL PANEL ASSEMBLIES USING A VACUUM PLATE

[75] Inventors: N. Keith Merser, Northbranch; Stanley E. Wencley, Rochester Hills, both of Mich.

[73] Assignee: Foamseal, Inc., Oxford, Mich.

[21] Appl. No.: 89,726

[22] Filed: Jul. 9, 1993

Related U.S. Application Data

[63] Continuation-in-part of Ser. No. 14,440, Feb. 5, 1993, Pat. No. 5,425,908.

[51] Int. Cl.$^6$ .................................................. B29C 65/00
[52] U.S. Cl. .................. 264/46.4; 264/46.5; 264/511; 156/79; 156/285; 156/304.1
[58] Field of Search .................. 264/46.4, 46.5, 264/511; 156/78, 79, 285, 304.1; 269/21

[56] References Cited

U.S. PATENT DOCUMENTS

| | | | |
|---|---|---|---|
| 3,715,115 | 2/1973 | Grobman | 271/132 |
| 3,811,982 | 5/1974 | Jacobsen | 156/285 |
| 3,895,087 | 7/1975 | Ottinger et al. | 264/511 |
| 4,044,512 | 8/1977 | Fischer et al. | 52/704 |
| 4,059,714 | 11/1977 | Scholl et al. | 156/78 |
| 4,244,901 | 1/1981 | Wencley et al. | 156/79 |
| 4,405,063 | 9/1983 | Wydo et al. | 222/55 |
| 4,439,392 | 3/1984 | Schutzler et al. | 425/123 |
| 4,581,186 | 4/1986 | Larson | 264/45.8 |
| 4,748,781 | 6/1988 | Wencley | 264/46.4 |
| 4,914,883 | 4/1990 | Wencley | 156/79 |
| 5,093,963 | 3/1992 | Farrington et al. | 264/511 |
| 5,234,519 | 8/1993 | Talbot et al. | 156/212 |

*Primary Examiner*—Allan R. Kuhns
*Attorney, Agent, or Firm*—Howard & Howard

[57] ABSTRACT

The method of forming rigid panel assemblies of this invention eliminates the requirement for mechanical fasteners and may be used to bond wall boards to studs, floor joists to wood flooring such as gypboards, fiberboards, plywood or OSB boards and trusses to ceiling panels. A preferred method of this invention includes applying a thin bead of a thoroughly mixed two-component liquid polyurethane foamable resin adhesive on the surface where the components are to be joined. The foamable resin is formulated to provide a long tack time or delay curing until the assembly is complete. Where the bead is applied to the side faces of the support members, the support members may be turned to orient the foam beads opposite the fibrous panel, which is preferably supported on a flat support surface, most preferably a vacuum plate which draws the panel flat. Finally, the beads are compressed against the fibrous panel, wetting the panel with liquid foam resin before the foam has gelled, permanently bonding the support members to the panel and forming the structural panel assembly. Where an enclosed panel assembly, such as a closed wall is desired, the structural members are attached to a first panel, orienting the support members for application of the polyurethane foam bead, as described. The support members are preferably adhesively bonded to the first panel while the first panel is flattened on a vacuum plate.

18 Claims, 3 Drawing Sheets

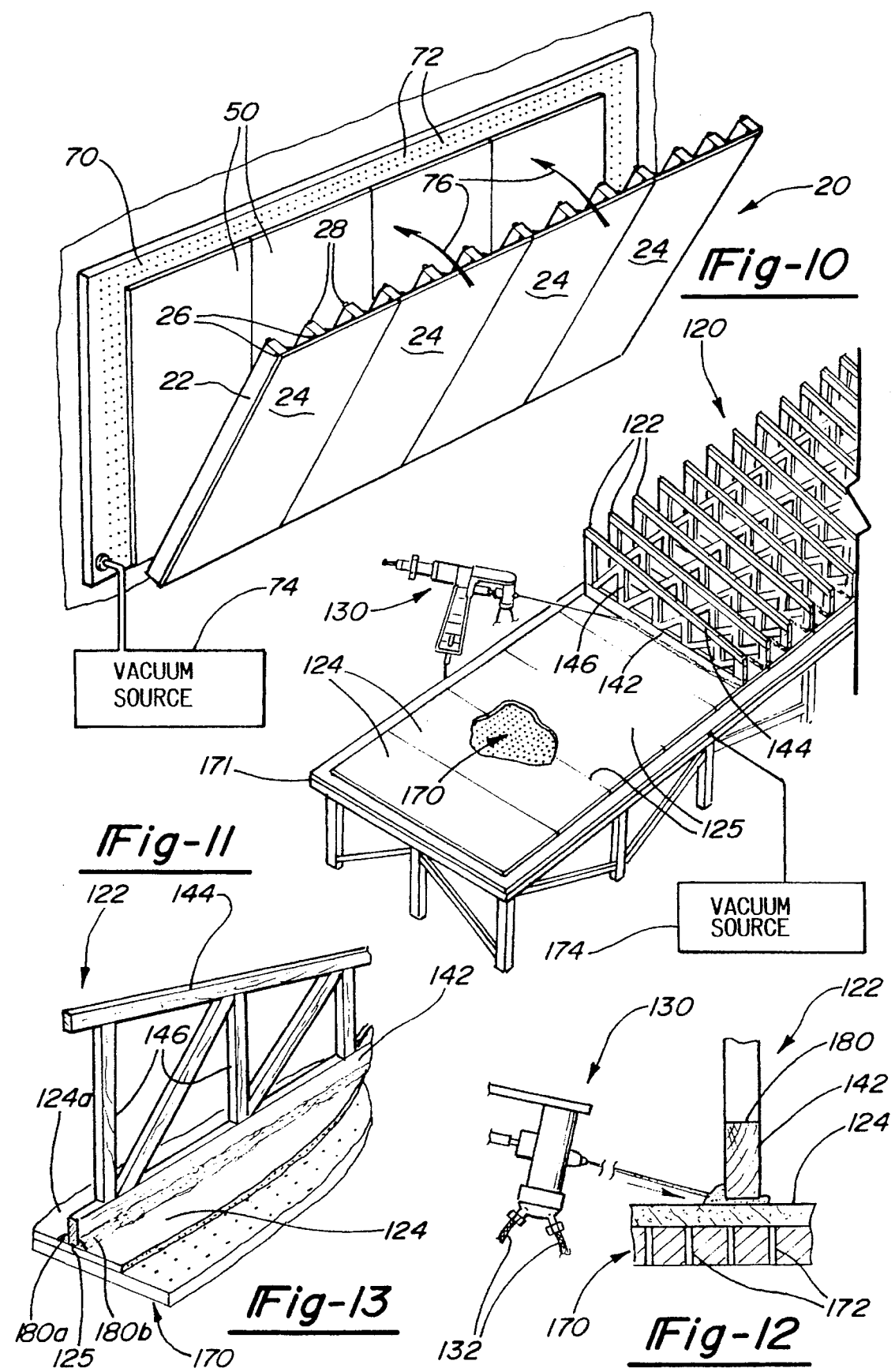

ically, but not
METHOD OF FORMING STRUCTURAL PANEL ASSEMBLIES USING A VACUUM PLATE This is a continuation-in-part of application Ser. No. 08/014,440 filed on Feb. 5, 1993, now U.S. Pat. No. 5,425,908.

BACKGROUND OF THE INVENTION

The present invention relates to a method of making prefabricated relatively rigid structural panel assemblies, such as prefabricated wall, flooring and ceiling assemblies used by the prefabricated or factory built construction industry, such as the manufactured housing industry. The panels which form the surface of the panel assembly are permanently attached to reinforcing studs, joists or trusses, forming a relatively rigid prefabricated module. Closed wall modules include a pair of opposing parallel panels forming the wall surfaces and a plurality of transverse studs permanently attached to the wall boards.

The method of this invention is particularly, but not exclusively, adapted to processes for making such structural panel assemblies without the requirement of mechanical fasteners, such as nails, staples or screws to secure the panel to the structural members, which must in most cases must be covered. A problem with the manufacture of prefabricated wall, floor or ceiling panel assemblies has been that the components are not uniform. The boards used for studs, joists and trusses do not have a level or straight plane and may have other discrepancies, such as knot holes. The fibrous panels to which such support members are attached are somewhat flexible and are often warped. Thus, a wall, floor or ceiling panel, which is supported by studs, joists or trusses attached by mechanical fasteners, is generally both warped and spaced from the reinforcing members in many locations. The exposed surfaces of the mechanical fasteners must also generally be covered. This is to hide the fasteners, which may also pop out after construction because of inherent assembly and user movement and stresses resulting from the warped and imperfect components. These problems can only be partially solved in "stick built" construction, where the wall, floor or ceiling panel assemblies are built entirely on site, by selection of materials, the use of shims, etc. However, factory or pre-built construction preferably utilizes mass production techniques which do not lend themselves to such hand-made adjustments.

Another serious problem with prefabricated wall, floor and ceiling panel assemblies is the joints between adjacent panels. A wall, floor or ceiling assembly generally includes several panels which are supported by structural elements in side-by-side coplanar abutting relation. As described above, the panels and supporting structural elements or members are often irregular in shape and often warped. Further, the abutting panel edges are not precisely aligned; there are gaps between the adjacent panel edges and the adjacent edges are displaced laterally at numerous places. This problem is "solved" when using "raw" (unfinished) panels by "taping and mudding," a time consuming and expensive process. The adjacent panel edges may be beveled or tapered to form a well bridging the abutting panel edges. This depression is filled with plaster or "mud" and taped. Following drying, the joint is sanded. This process is generally repeated, at least once and the joint may take several hours or even days to dry, particularly in a humid factory, creating a manufacturing bottle neck. Where the panels are prefinished, it is generally not possible to tape and mud the joints. In such cases, the irregular seams between abutting finished panels are usually covered by batten strips. Batten strips are expensive and give an undesirable and unfinished appearance to a wall or ceiling. The batten strips generally do not exactly match the wall or ceiling and protrude from the panels. Thus, there is a need for a process which eliminates the requirement for costly and unattractive seam concealment, such as taping and mudding or batten strips.

U.S. Pat. Nos. 4,244,901 and 4,748,781, assigned to the assignee of this application, disclose methods of forming reinforced panel assemblies utilizing polyurethane foam to bond the structural support members to the panels. In the preferred embodiment, the panel is laid upon a flat support surface, the studs or support members are located on the back of the panel and clamped. A high pressure stream of a liquid foamable resin is then directed to the juncture of the support members and the panel, such that the resin foams and fills the space between the support members and the panel, permanently bonding the support members to one surface of the panel without mechanical fastening means. This method has been commercially successful in making prefabricated or factory-built structural panel assemblies; however this process is not suitable for enclosed panel construction, such as a closed wall structural assembly and does not eliminate the requirement for taping and mudding or batten strips.

The method of this invention has several advantages over the prior an and is suitable for the manufacture of enclosed panel structures, such as closed wall assemblies used by the manufactured construction industry. The disclosed method may be substantially automated and utilizes a relatively small amount of foamable resin adhesive. The method of this invention may also be used at any temperature normally encountered by the factory-built construction industry. Upon completion of the reinforced panel assembly, the assembly can be moved almost immediately using conventional mass production material handling techniques.

SUMMARY OF THE INVENTION

As stated, the method of this invention is particularly suited for the manufacture of reinforced structural fibrous panels, such as used by the manufactured construction industry for walls, floors and ceilings. The method of this invention may also be adapted for mass production techniques utilizing the materials now used by the prefabricated or factory-built construction industry.

In one preferred embodiment of method of this invention, the reinforcing members, which may be wall studs, ceiling trusses or floor joists for example, are first oriented and supported such that a foamable adhesive may be applied to the relatively thin side faces of the support members. Where an enclosed structural assembly, such as a closed wall is to be manufactured, the support members are preferably first attached to one panel and the panel is supported such that the foamable adhesive may be applied to the exposed surfaces of the support members. The support members may be attached to the first panel for example by the methods disclosed in the above-referenced U.S. Pat. Nos. 4,244,901 or 4,748,781. As disclosed in U.S. Pat. No. 4,748,781, the structural support members may also be metal channels.

This preferred embodiment of the method of this invention then includes applying a thin bead of a thoroughly mixed two-component liquid polyurethane foamable resin adhesive axially along the side surfaces of the support members. The foamable resin adhesive preferably has a relatively long tack time and is preferably resilient or pliable, having good wetting characteristics, green strength and fast reacting with controlled cure, such that the time that the foam remains resilient and tacky can be extended and controlled. The preferred foamable resin is of relative low viscosity and preferably is also thixotropic, such that the resin can be thoroughly mixed in an impingement mixing chamber of an application gun, but the resin bead does not run upon application. The foam is then allowed to substantially fully cream and rise, forming a semi-liquid foam or fluid polyurethane bead. The support surfaces of the support members having the foamed polyurethane bead are then pressed against the panel to be joined to the support members, compressing the polyurethane beads and thoroughly wetting the panel, permanently bonding the support members to the panel, without requiring mechanical fasteners or clamps. This should be completed before the polyurethane foam beads cure tack free or the polyurethane foam will not wet the surface of the panel and bond.

In other applications, such as where the application gun is computer controlled, it may be desirable to apply the foam bead to the panel first, rather than the support members. In such an application, the panel will be laid upon a flat support surface. A predetermined pattern of polyurethane foam beads are then applied to the panel, with the pattern of foam beads corresponding to the desired locations for the support members. Where a double walled structure is to be made, the structural support members are first bonded or otherwise attached to a second panel, as described, or the support members may be supported in a fixture. The side faces of the support members are then applied to the polyurethane beads, permanently bonding the structural support members to the panel, as described.

In one preferred embodiment of the method of this invention, the panel which is to be bonded to the support members is first laid upon a flat horizontal support surface. After applying the bead to the support members, the support members are turned or rotated to orient the support member surfaces having the polyurethane foam beads downwardly over the panel and the support surfaces are then pressed against the panel to compress the foam beads, wetting the panel surface and permanently bonding the support members to the panel. The foam beads thus fill-in any imperfections or warped areas of the reinforcing support members and the panel remains substantially flat following attachment of the support members. Further, neither the panel nor the support members are stressed during attachment and no mechanical fastening means is required.

In another preferred embodiment of this invention, the support members are oriented generally vertically, such that the side surfaces of the structural support members which receive the polyurethane foam extend vertically. Where a double or enclosed wall is being manufactured and the studs are first attached to a first panel, as described above, the panel assembly with the attached studs is oriented generally vertically. The polyurethane foam beads are then applied to the vertically oriented edge faces of these studs. When the polyurethane beads have creamed and risen, a second panel is pressed against the surfaces of the studs which have the foam beads, permanently bonding the second panel to the first and forming an enclosed wall structure. The second panel may also be oriented and supported vertically prior to bonding. This method saves significant factory floor space, particularly where several panels are utilized to form a continuous wall, floor or ceiling and factory floor space is often at a premium.

The polyurethane foam bead is preferably applied axially along substantially the entire length of the reinforcing support members at a relatively slow forward velocity to avoid splatter and assure a good bond between the structural reinforcing members and the panel. To avoid splatter, the gun should be moved at about the forward velocity of the resin exiting the gun. A liquid resin bead having a width of about ¼ inch applied at an application rate of less than about 3 feet per second has been found suitable for most hand applications. A two-component liquid foamable polyurethane resin adhesive is also preferred. The foamable resin adhesive should be relatively slow acting and the formulation is preferably adjustable to accommodate the environment of the application. In the most preferred embodiment of the method described above, the liquid polyurethane foamable resin begins to cream almost immediately to avoid dripping and substantially fully rises within a few minutes, such that the foam bead is ready for bonding, as described. The foam bead is pressed against the panel or structural member before the foam cures or the foam will not satisfactorily wet and bond sufficiently. Thus, the polyurethane foam should be formulated for the particular application. In the most preferred embodiment, the foam fully rises quickly, but the foam does not cure tack free for at least 10 minutes and may, if preferred, not cure for about 20 minutes or more. In a preferred application, a polyurethane foam which cures in about 15 to 20 minutes has been found to be particularly suitable for mass production applications.

In the most preferred method of forming a continuous wall, ceiling or floor assembly having a plurality of panels supported inside-by-side coplanar relation, the panels are first located and oriented in an abutting coplanar relation on a flat vacuum plate; a vacuum is then drawn on the panels to flatten the panels against the vacuum plate; the structural members are then bonded to the panels with a polymeric foam adhesive, permanently securing the panels in the flattened orientation. Following curing of the foam adhesive, the vacuum is removed and the panel assembly is removed from the vacuum plate. The structural members are preferably oriented on the panels, such that a structural member bridges the adjacent edges of abutting panels and the polymeric foam adhesive fills-in any imperfections or spacing between the structural members and the panel edges, permanently securing the adjacent panel edges in flat abutting relations.

Thus, the preferred method of this invention results in a flat structural panel assembly, without bowes or "wows" in the panels using available conventional construction materials which, as described above, include numerous imperfections. For example, the structural members may be wood strips which may not be straight and include knot holes. The panels will not be completely flat. Taping and mudding may also be eliminated because the adjacent panel edges of the abutting coplanar panels are flat, eliminating gaping and lateral edge displacement. Where the panels have a prefinished surface, batten strips will not be required. With unfinished or "raw" panels, the abutting edges of the panels may include a slight chamfer which may be filled-in with conventional polymeric, cementacious or other caulking, which may be troweled and sanded, if necessary. This method, therefore, results in a substantial savings in time, materials, hand labor, and therefore costs, but results in an improved finished appearance of the entire assembly.

The method of making a structural panel assembly of this invention is thus particularly suitable for the manufacture of prefabricated or factory-built reinforced fibrous panel assemblies, including rigid enclosed panel assemblies, such as closed wall panel assemblies or modules used by the construction industry. A closed wall assembly may be built by the method of this invention without using mechanical fasteners or clamps and both walls may be substantially perfectly flat using mass production techniques. The reinforced wall construction may be handled using industrial mass handling techniques almost immediately upon completion of the bond and without requiring clamps. Other advantages and meritorious features of the method of this invention will be more fully understood from the following description of the preferred embodiments, the appended claims and the drawings, a brief description of which follows.

BRIEF DESCRIPTION OF THE DRAWINGS

FIG. 10 is a side perspective view of a final step in the method of forming an enclosed wall structure wherein the panels are oriented vertically;

FIG. 11 is a top perspective view illustrating a preferred method of attaching the structural elements to panels supported on a vacuum table;

FIG. 12 is an enlarged end cross-sectional view of the method illustrated in FIG. 11; and FIG. 13 is an end perspective partially cross-sectioned view of a structural member attached to two abutting panels.

DESCRIPTION OF THE PREFERRED EMBODIMENTS OF THE METHOD OF THIS INVENTION

As described above, the method or process of this invention is particularly suitable for making structural panel assemblies without requiring mechanical fasteners. The method of this invention will form panel assemblies having a flat finish panel, although the structural support members are warped or irregular and the panel was initially warped or "wowed." The structural panel assemblies which may be formed by the method of this invention, include prefabricated wall, flooring and ceiling assemblies, and outside walls, such as used by the manufactured housing, recreational vehicle and prefabricated industrial building industries. The method of this invention may also be used to make closed wall assemblies or modules having a plurality of parallel panels supported by studs permanently adhesively bonded to the panels.

Figure 1:
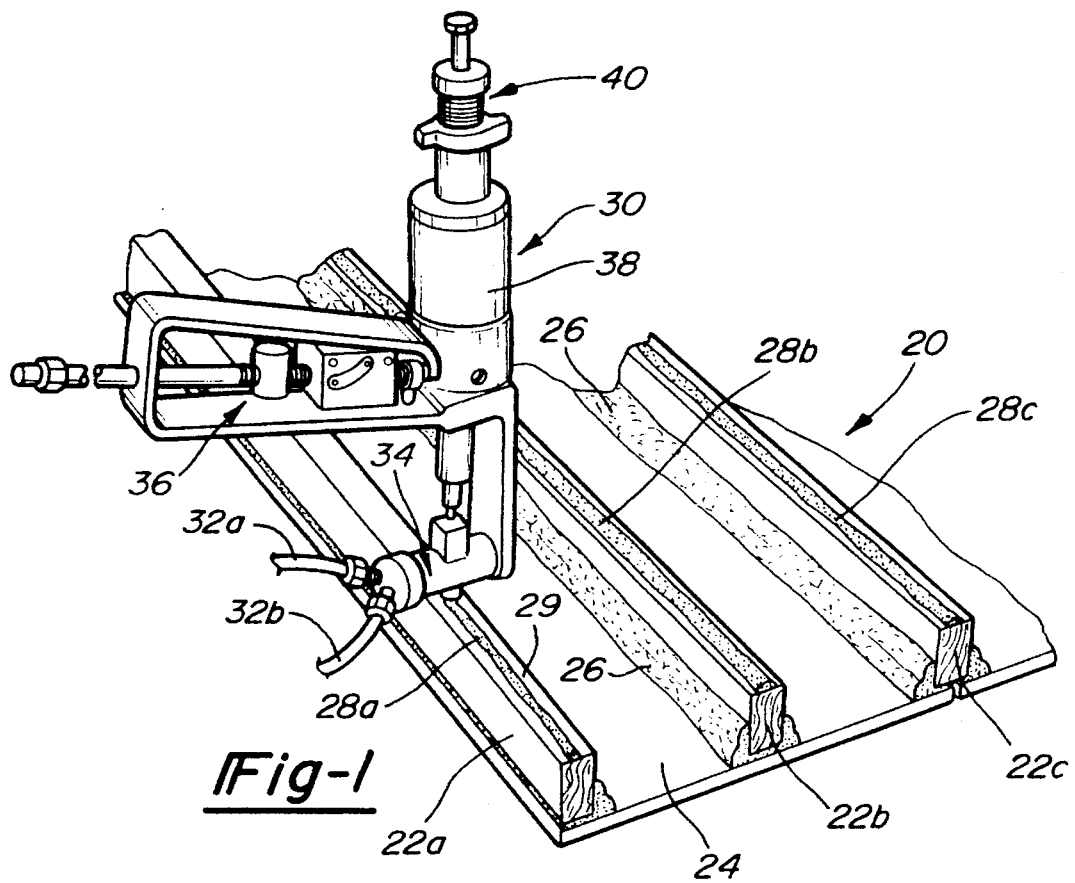
FIG. 1 is a perspective view of a panel assembly illustrating the application of a foam bead on the structural support members.

FIG. 1 illustrates a method of forming a first panel assembly 20 as may be utilized in the method of this invention. As shown, the panel assembly 20 includes a plurality of generally parallel structural members 22a, 22b, 22c, etc. which have been secured to a first panel 24 by foam resin or polymeric adhesive as described, for example, in the above-referenced U.S. Pat. No. 4,244,901. A more preferred method of this invention using a vacuum plate is described hereinbelow. Such structural support members 22 are commonly referred to as studs in wall assemblies, joists in floor assemblies and trusses in ceiling assemblies. In the disclosed embodiment of the first panel assembly 20, the structural support members 22 are wood, such as the wood 2×4's commonly used for studs in wall assemblies. It will be understood, however, that the structural support members 22 may be formed of any material which may be used by the construction industry, including for example the channel-shaped metal structural support members disclosed in U.S. Pat. No. 4,748,781. The structural support members may however be secured to the first panel 24 by any other suitable means, including mechanical fasteners. However, as described in the above-referenced U.S. patents, the structural members 22 are more preferably bonded to the first panel 24 by a thin high pressure stream of polyurethane foam adhesive directed to the base of the structural members, forming a generally flat panel assembly.

In the embodiment of the method of this invention shown in FIGS. 1 to 5, a thin bead 28 of a thoroughly mixed two-component liquid polyurethane foamable resin adhesive is applied to the thin side faces 29 of the structural members which are to be bonded to the finish panel, as described below. As shown, the foamable resin or polymeric adhesive is applied to the structural members by a foam application gun 40. The disclosed embodiment of the foam application gun includes lines or hoses 32a and 32b, which receive and deliver the A-isocyanate and B-resin components of the foamable resin adhesive, to an impingement mixing chamber 34 described more fully hereinbelow, a trigger assembly 36, a pneumatic cylinder assembly 38 and a manual screw adjustment assembly 40 which adjusts the throw of the valve rod 76 shown in FIGS. 8 and 9. The disclosed embodiment of the application gun 30 is a commercially available Model D spray gun sold by Gusmer Corp. of Lakewood, N.J. Of course, other two-component liquid foamable resin adhesive spray guns preferably having a high velocity impingement mixing chamber or module can also be used. Another suitable foam application gun is the Model GX-7 gun having a high impingement module available from Gusmer Corp. Although conventional two-component foam spray guns may be used, the gun is preferably modified or adjusted, as described below, to produce a relatively low forward velocity stream of thoroughly mixed polyurethane foam resin adhesive to produce a relatively thin bead of foamed resin adhesive for the method of this invention.

In the method disclosed in FIG. 1, a thin foam bead 28a of liquid foamable resin adhesive is being applied to the "top" face 29 of structural support member 22a by foam application gun 30. The first panel assembly 20 may for example be supported on a horizontal surface or, as described below, angled to reduce the required floor space. The gun is preferably moved at about the forward velocity of the liquid stream of polyurethane foamable resin adhesive exiting the application gun 30, such that there is substantially no splatter. The gun may be hand-held, as shown, or the gun may be supported on an application machine (not shown) which may be computer controlled. As shown in FIG. 1, the bead 28a is very thin, as applied. The liquid foamable resin adhesive bead then begins to cream and rise almost immediately following application, such that the bead is substantially fully creamed and expanded as shown at 28b (see FIG. 3) within a few seconds after application; preferably in less than 3 seconds. In a typical application where the foam bead is applied to the thin face of a 2×4 inch structural support member, a liquid bead having a width of about ¼ inch upon application has been found to be very effective. The bead then creams and rises to about double the original height and width, or about ½ inch, as shown at 28b and 28c in FIG. 1 and 28b in FIG. 3.

A two-component polyurethane foamable resin adhesive was especially formulated by the applicant for the method of this invention, although it is believed that other formulations may be suitable. As described, the forward velocity of the liquid foamable resin adhesive exiting from the application gun is relatively slow to form a bead preferably without splatter, preferably less than about 5 feet per second or about 1 to 3 feet per second for hand-held gun applications. The A and B components of the foamable polyurethane resin should preferably be thoroughly mixed before application. To achieve thorough mixing, an application gun having a relatively high pressure impingement mixing chamber was selected and used with relatively low viscosity liquid foamable resin components. When applied, however, the foamable resin bead should not run. To achieve this result, a thixotropic formulation was developed which begins to cream and rise almost immediately upon application, but at the same time the foam bead has an extended rate of cure time.

Further, as described, the method of this invention is particularly suitable for forming wall, ceiling and flooring assemblies for the prefabricated construction industries, such as the manufactured housing industry. Thus, the polyurethane foamable resin is preferably formulated for use at a relatively wide range of ambient temperatures, preferably between about 30 and 100 degrees Fahrenheit. Ambient humidity should not adversely affect the resultant bond. Finally, the method of this invention is also suitable for mass production of structural panel assemblies, including automated assembly processes. Thus, the foamable resin adhesive preferably sets up and cures in a controlled manner. In most applications, it is preferred that the foamable resin adhesive cures in about 10 to 30 minutes, permitting completion of the assembly before the foam beads fully cure tack free. For most applications, the foamable resin adhesive should fully rise in less than 2 minutes and cure in 15 to 25 minutes at the ambient temperature where the beads are applied. Of course, the foamable resin adhesive must also provide an excellent bond between the structural support members and the panel. To accomplish good bonding with the method of this invention, the foam bead must have good wetting characteristics, a relatively long tack time and good green strength. As described, the reinforced panel assembly formed by the method of this invention can be picked up and handled almost immediately following completion of the assembly.

Current polyurethane systems used by the factory-built construction industry include single component moisture cured polyurethane foams and dual component nonfoamed static mix systems. With the moisture cure process, the manufacturer is limited in its use because the cure/set time varies from 0.75 hours to more than 1.5 hours. The dual component nonfoamed polyurethane systems presently available use a static mix process that may be both costly and involves a solvent flush, such as methylene chloride. With a solvent flush, the uses are limited because of environmental problems and hazardous waste disposal requirements. The use of a resin foam adhesive has several important advantages, including reduced cost, adhesion to irregular surfaces, provision of a thermal break and filling of gaps. The two-component polyurethane foamable resin adhesive of this invention is water blown and mixed in the application gun, eliminating the requirement for static mixing, solvent cleaning and the like and permitting use in the method of this invention with very limited environmental concerns.

The following formulation was developed by the applicant for the B polyol side of the resin adhesive:

| Constituent | Weight Percent |
|---|---|
| PG 76-120 | 90–92% |
| R 420 | 4.5–5.5% |
| L 5420 | 1.4–1.45% |
| $H_2O$ | 2.5–2.6% |

PG 76-120 is a polyether polyol available from Olin Corp. PG 76-120 has improved wetting characteristics, reduced viscosity and improves the pliability of the polyurethane foam. It also reduces friability and reduces stryration or crystalization. R 420 is also a polyether polyol available from Texaco Chemical Co. which provides improved reactivity. L5420 is a silicone surfactant available from Union Carbide Chemicals & Plastics Co., Inc. The $H_2O$ is distilled water. The A-isocyanate side of the formulation is 100 percent methylene bis 4-phenyl-isocyarate available from Miles Inc. and ICI Americas, Inc.

In some applications, it is desirable to reduce the cure time of the polyurethane loam to three minutes or less. The above formulation can be modified to achieve a faster cure time by adding an amine polyol, such as jeffamine polyol which may be substituted primarily for the PG 76-120 polyether polyol and the R 420 Polyether polyol is increased as set forth in formulation, below. A suitable formulation for the B polyol side of the resin adhesive having a cure time of about three minutes is as follows:

| Constituent | Weight Percent |
|---|---|
| PG 76-120 | 40–42% |
| D 400 | 20–22% |
| R 420 | 33–37% |
| L 5420 | 0.8–1.2% |
| $H_2O$ | 1.8–2.2% |

D 400 is a jeffamine polyol available from Texaco Chemical Co.

The above formulation is suitable for applications at most ambient temperatures encountered under production conditions greater than about 45° F. At lower ambient temperatures or temperatures between about 30° F. and 65° F., the following modified formulation was found to be particularly suitable for the B polyol side of the foamable resin adhesive:

| Constituent | Weight Percent |
|---|---|
| PG 76-120 | 73–76% |
| R 420 | 20–22% |
| L 5420 | 1.5% |
| 33 LV | 0.6% |
| $H_2O$ | 2.2% |

33 LV is an amine catalyst available from Union Carbide Chemical & Plastics Co. The other components are described above. As will be understood by those skilled in the art, adjusting the polyether polyol ratio and adding an amine catalyst makes the foam formulation "hotter", providing a good foam bead at colder ambient temperatures. The A iso side of the formulation may be the same as the formulation described above.

The green sheer strength of the described foam resin adhesive utilized in the method of this invention is as follows:

| Time | Sheer Strength |
| --- | --- |
| 10 min. | 117.00 psi |
| 11 min. | 121.30 psi |
| 13 min. | 136.80 psi |
| 17 min. | 199.00 psi |
| 20 min. | 254.80 psi |
| 24 hrs. | 604.30 psi |

Thus, the reinforced panel assembly formed by the method of this invention can be picked up and handled by conventional material handling techniques within a few minutes after bonding.

Figures 2, 3, 4:
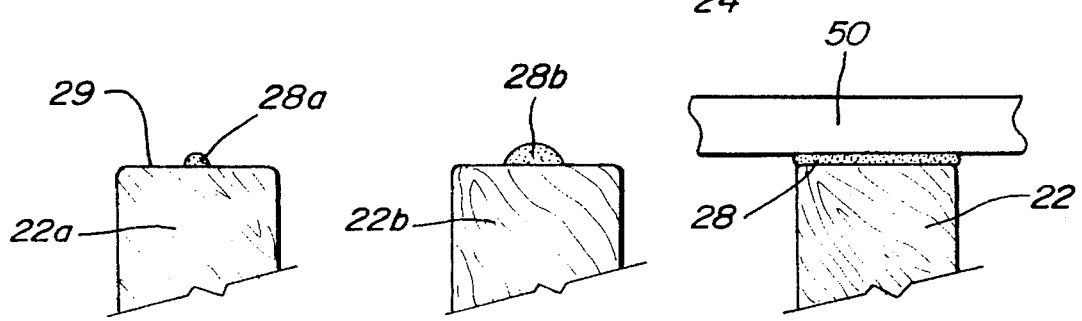
FIG. 2 is a partial end view of a structural support member immediately after the application of a bead of liquid foamable resin adhesive.
FIG. 3 is a partial end view of a structural support member, similar to FIG. 2, after the bead has substantially fully creamed and risen.
FIG. 4 is an end view of a structural support member bonded to a finish panel.

As will be understood by those skilled in the art, however, the above described method of this invention may also be performed with other foam adhesives. For example, it should be possible to utilize a conventional plural component polymeric adhesive which is applied through an application gun having a conventional disposable static mixing chamber, wherein a gas, such as nitrogen, is introduced into the mixing chamber or the line for one of the components to form a polymeric foam adhesive. In such an application, however, the polymeric foam adhesive will not cream and rise following application. Instead, the polymeric foam bead will be similar to the bead 28b shown FIG. 3 when applied. The foam bead will then be compressed against the panel as shown in FIG. 4, wetting the panel and the end surface 29 of the structural member 22, as described above.

Figure 5:
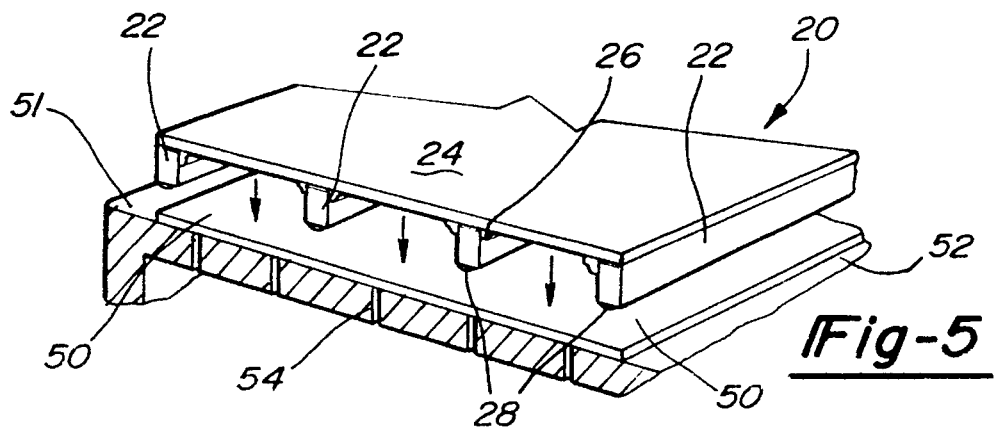
FIG. 5 is a top perspective view illustrating a preferred method of applying the structural support members to the finish panel.

After the bead 28 is applied, as shown in FIG. 1 at 28a, the bead is allowed to substantially fully cream and rise, forming an enlarged foam bead on the surface 29 of the structural support members which are to be bonded to the finish panel 50. As shown in FIG. 4, the finish panel 50 may then be applied on top of the bead and pressed. More preferably, the first panel assembly 20 may be turned as shown in FIG. 5 and the support members applied to the finish panel supported on a flat surface, most preferably a flat vacuum table 52. In either method, the volume of the bead 28b should be sufficient to completely bridge the mating surfaces of the finish panel 50 and the structural support members 22 as shown in FIG. 4. Where a flat finish panel is desired, the panel is preferably first laid on a flat support surface, such as the vacuum table 52 shown in FIG. 5. A vacuum table having a plurality of holes 54 may be desired where the panel is relatively flexible, but is warped or includes "wows".

As stated above. FIG. 5 illustrates a preferred embodiment of the method of this invention. As shown, the first panel assembly 20 is turned or rotated, such that the beads 28 overlie the finish panel 50, which is supported on the vacuum table 52, as described above. The first panel assembly 20 is then pressed against the finish panel, compressing the beads 28 against the finish panel. The polyurethane foam then wets the finish panel, forming a permanent bridge between the finish panel 50 and the structural support members 22, as shown in FIG. 4. Thus, it is necessary to complete this step before the polyurethane foam beads fully cure tack free. Further, the polyurethane foam beads must be sufficiently flexible to bridge the interface between the structural members and the finish panel. The completed structural panel assembly may be lifted and handled almost immediately upon pressing of the structural members 22 against the finish panel. That is, the bonding is almost instantaneous, which is an important advantage of the method of this invention.

Figure 6:
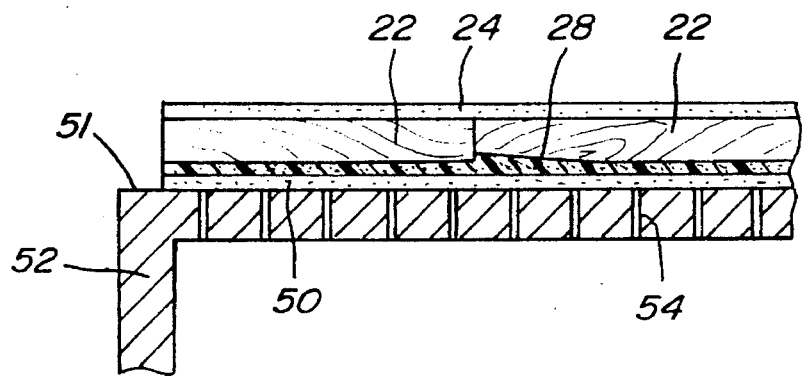
FIG. 6 is a side view of a rigid structural panel assembly formed by the method of this invention.
Figure 7:
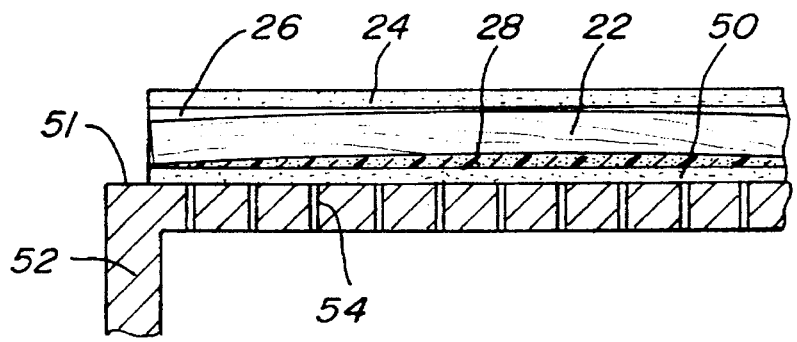
FIG. 7 is another side view of a rigid structural panel assembly formed by the method of this invention.

FIGS. 6 and 7 illustrate structural panel assemblies formed by the method of this invention. As described above, the finish panel 50 is preferably first laid upon a flat surface 51. In the disclosed embodiment, the flat surface is provided by a vacuum table 52 having a plurality of spaced holes 54. A vacuum is drawn on the underside of the table 52 which draws the panel 50 against the flat surface 51, ironing out any warpage or "wows" in the flexible panel 50. FIG. 6 illustrates a common situation where the structural support members 22 are of different widths. As stated above, the structural support members 22 are commonly 1×3's, 2×4's or 4×6's as used for studs in wall panel assemblies, joists in flooring assemblies and trusses in ceiling assemblies. The dimensions of such lumber, however, vary significantly. The "long" side (i.e. the four inch side of a 2×4) may vary as much as ½ inch. As shown, however, the foam bead 28 fills in the additional space required by the thinner structural members, such that the finish panel 50 remains completely flat. FIG. 7 illustrates the situation where the structural member 22 is warped or bowed. As shown, the foam bead 28 will similarly fill the concave areas, such that the finish panel 50 remains 11 at. As described, the finish panel is retained flat on the vacuum table 52 when the first panel assembly is turned and applied to the finish panel, as shown in FIG. 5.

Figure 8:
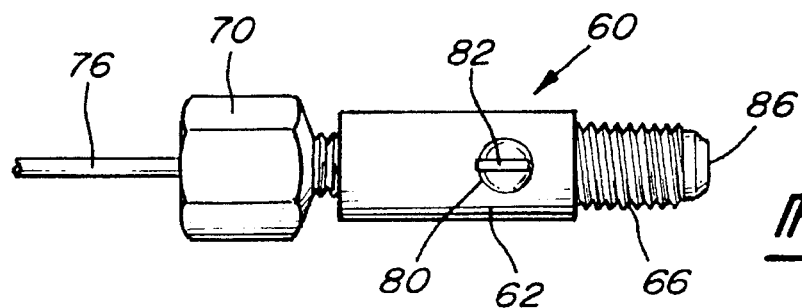
FIG. 8 is a side view of an impingement mixing chamber of a foam application gun suitable for use in the method of this invention.
Figure 9:
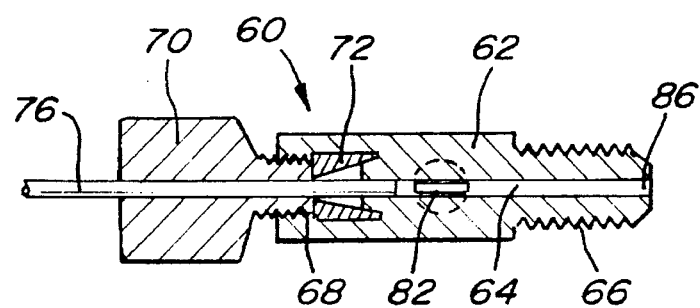
FIG. 9 is a side cross-sectional view of the mixing chamber shown in FIG. 8.

FIGS. 8 and 9 illustrate a mixing chamber 60 of the foam application gun 30 of FIG. 1. The mixing chamber 60 includes a cylindrical body 62 having an axially bore 64 which defines the mixing chamber. The end 66 is externally threaded to receive a nozzle (not shown) and the opposite end is counterbored at 68 to receive a ferrule 72 and internally threaded to receive a packing or lock nut 70. A valve rod 76 is reciprocated in the axial bore 64 by the pneumatic cylinder assembly 38 of FIG. 1 as described below.

When the value rod is retracted, the A and B components of the foam resin adhesive enter the mixing chamber 64 separately through very small slots 82 on opposite sides of the valve body 62. Hardened inserts 80 may be provided to reduce wear. The slots have a width of about ½ the diameter of the bore mix chamber 64, such that the high impingement force of the liquid foamable resin components entering the chamber is dissipated sufficiently to generate a low velocity bead, as described above. In an actual embodiment, the width of the slot 82 was 0.046 inches and the diameter of the bore mixing chamber 64 was 0.078 inches. The viscosity of the A iso side was 250 cps and the B polyol side was 560 cps. The inlet pressure was 400 psi. The A and B components were thoroughly mixed in the high impingement mixing chamber and exited the bore at about 3 feet per second, forming a relatively thin bead of foamed resin adhesive using without splatter using a hand-held application gun, as described above.

The foam application gun 30 shown in FIG. 1 is operated by actuating the trigger mechanism 36, which operates the pneumatic cylinder to retract the valve rod 76 beyond the slot 82, permitting the A iso and B polyol components of the foamable resin to enter the mixing chamber 64 under high impingement pressure, where the components are thoroughly mixed. The foamable resin adhesive then exits the outlet 86 of the mixing chamber, where it is applied in the form of a thin liquid bead 28a as shown in FIGS. 1 and 2.

Almost immediately, the liquid bead creams and rises, forming the foam beads 28b and 28c as shown in FIGS. 1 and 3. The application gun 30 may be hand-held or the gun may be supported on a movable fixture and computer-controlled, for example. Where the gun is computer-controlled, it may be preferred to apply the foam beads first to the finish panel 50. The structural support members may be secured to a first panel 24 as shown in FIG. 1, or the structural support members 22 may be oriented and supported in a jig or fixture, eliminating the requirement for a first panel in a floor assembly, for example.

The foam 28 preferably substantially fully bridges the interface between the structural support members 22 and the finish panel 50 as shown in FIG. 4, such that the finish panel 50 does not contact the structural support members 22. The cellular foam adhesive also provides a resilient joint between the structural support members and the finish panel and a thermal break. These advantages are provided even where the foam bead is interrupted at predetermined locations to reduce cost.

The factory built housing industry uses various materials to make structural panel assemblies of the type described herein. Today, the most commonly used panels for inside applications are gypsum or "gyp boards," which comprise a layer of gypsum cement and filler materials, which is covered with paper. Although the "gyp boards" are relatively flat when manufactured, the panels are stored in stacks, generally for several weeks or even months, before use. Thus, gyp boards are not perfectly flat when used. The gyp boards used by the construction industry generally have a width of four feet and range in length from eight feet to sixteen feet or greater. Thus, for example, a prefabricated ceiling assembly for a "mobile home" having a ceiling formed in halves may have two twelve by sixty foot prefabricated ceiling assemblies comprising fifteen four foot by twelve foot gyp boards which are supported by wood trusses spaced every sixteen or twenty-four inches. The trusses prefabricated from wood are typically thin strips (e.g. 1×2 in., 2×3 in., 2×8 in., etc.) as shown, for example, in FIG. 11, and described below. The abutting edges of the gyp boards do not normally exactly match and the joints between the abutting edges include numerous gaps, which may be one-quarter inch or greater. These imperfections are normally covered when "raw" or unfinished gyp boards are used by taping and mudding, as described above. This is a time-consuming labor intensive process which results in substantial costs to the manufactured housing industry. Where the gyp boards are prefinished, however, the imperfect abutting edges cannot be hidden by taping and mudding. Instead, batten strips are used, which results an unsightly strip of plastic generally every four feet. As described above, batten strips are relatively expensive and many purchasers object to the unsightly appearance.

Fiberboards are generally used on exterior surfaces by the housing industry, although wood paneling and fiberboard may also be used on interior and exterior surfaces. As will be understood, fiberboards and wood panelling warp and include numerous imperfections. Further, as described above, structural support members, such as studs, joints, and trusses formed of fibrous materials are not straight, particularly when used following storage, and include numerous imperfections. The methods of this invention are particularly adapted to the use of such construction materials, but results in a substantially flat panel assembly, including panel assemblies having several abutting coplanar panels of the type described herein. As used herein, fibrous panels include gypsum boards, fiberboards, wood panelling and panels formed of similar materials.

FIG. 10 illustrates a method of forming a closed wall assembly wherein the panels are oriented generally vertically to conserve factory floor space as described above. The first panel assembly 20 was formed as described above and includes a plurality of rectangular fibrous panels 24 which are oriented in abutting edge-to-edge coplanar and retained by structural support members 22. As described above, the panels 24 may be "gyp boards" or the like and the structural support members 22 may be wood 2×4 s or the like. Studs 22 are adhesively bonded to the panels 24 by a foam adhesive 26, rigidly supporting the panels as shown. A plural component polymeric foam adhesive bead 28 gas been applied along each of the end faces of the studs 22 as shown in FIGS. 1 to 3. The polymeric foam adhesive beads may be applied to the end faces of the studs while the studs are oriented on a horizontal support or while the studs are oriented generally vertically as shown in FIG. 10. Where the studs are oriented vertically when the polymeric foam adhesive beads are applied, the viscosity of the foam adhesive should be increased to avoid dripping. The panels 50 are first oriented in abutting coplanar relation on a vertical flat vacuum plate 70 as shown in FIG. 10. The vacuum plate 70 includes a plurality of small apperatures 72. A vacuum is then drawn through the vacuum plate 70 by vacuum source 74 which draws the flexible fibrous panels 50 flat against the vacuum plate. As described above, the panels 50 utilized by the factory built home industry included bowed portions and imperfections which are ironed out when flattened against plate 70. The first panel assembly 20 is then moved to engage the end or edge surfaces of the studs 22 including the polymeric resin adhesive foam beads against the panels 50 as shown by arrows 76. The first panel assembly 20 is then compressed against the panels 50 to wet the end surfaces 29 of the studs 22 and the panels 50 as shown in FIG. 4. In the most preferred embodiment of the method of this invention, the polymeric foam adhesive, which is most preferably a plural component polyurethane foam adhesive is then allowed to cure tack free, permanently bonding the first panel assembly to the panels 50 while the panels 50 are retained flat against the vacuum plate 70. Thus, the panels 50 are permanently retained substantially perfectly flat and the closed wall assembly may then be removed from the vacuum plate 70. In the most preferred embodiment, the end faces of the studs bridge the abutting edges of the panels, permanently retaining such abutting edges in flat coplanar relation and, eliminating the requirement for mudding and taping, as described above.

FIGS. 11 to 13 illustrate a preferred method of making the first panel assembly, such as the panel assembly 20 shown in FIGS. 1, 5 and 10. FIGS. 11 to 13, however, illustrate a preferred method of manufacturing a prefabricated ceiling panel assembly 120. The panels 124 are first oriented in abutting edge-to-edge coplanar relation on vacuum plate 170 of vacuum table 171 as shown in FIG. 11. The trusses 122 may be prefabricated from wood strips. The trusses 122 illustrated are of conventional construction and include an upper chord 140, a lower chord 144 and braces 146. As shown, the ceiling is actually manufactured up-side-down with finish side of the ceiling panels 124 supported on the vacuum plate 170, such that the finish side be substantially perfectly flat and the requirement for taping and mudding is eliminated. The trusses 122 are then oriented on the ceiling panels 124 as shown in FIG. 11 with the trusses running generally parallel to the abutting edges 125 of the ceiling panels 124. As shown in FIG. 13, an upper chord 142 preferably bridges the abutting edges 125 of each of the adjacent panels to secure the panels together as described below. In a wall or floor construction, the studs or joists may run perpendicular to the abutting edges of the panels, such that all of the structural support members may bridge the abutting edges of each of the panels.

A vacuum may then be drawn against the underside of the vacuum plate 170 by a conventional vacuum pump or other vacuum source 174. This draws the flexible panels 124 flat against the flat vacuum plate 170 including the abutting edges 125 of the panels. A thin stream of a liquid foamable polymeric resin adhesive, is then preferably directed under pressure to the interface between the structural support members 122 and the panel 124. In the disclosed embodiment, the stream is generated by a conventional high pressure impingement mixing spray gun 130. In the most preferred embodiment, a two component polyurethane foamable resin adhesive is used, wherein components are received through lines 132 to the mixing chamber. A suitable mixing spray gun is available from Gusmer Corp., such as the Gusmer Model D Spray Gun. The gun should be adjusted so that the applicator can accurately direct a thin stream to the interface between the structural members and the panels. The most preferred polymeric resin foam adhesive is a two component polyurethane foamable adhesive available from Foamseal, Inc. under the trade name F-2100.

As shown in FIG. 12 the liquid foamable resin adhesive flows under the upper chord 142, wetting the opposed faces of the upper chord 142 and the panel 124. The liquid foamable resin then creams and rises to fill the voids between the irregular structural elements 142 and the panel 124 which is retained flat against the vacuum plate 170. As described above, the vacuum plate includes numerous holes 172 through which the vacuum is drawn. As the liquid foamable resin adhesive creams and rises, a fillet of foam 180 is formed on the side of the chords which receives the foamable resin shown in FIG. 12. This fillet wets the side surface of the upper chord 142 and the panel, forming a very strong joint between the structural member 122 and the panel. The foam further rigidly retains the panel in the flattened state. It has been found necessary to apply the liquid foamable resin from only one side the of structural members, except where the members bridge the abutting edges, as shown in FIG. 13.

FIG. 13 illustrates a preferred embodiment of the joint between adjacent panels 124a and 124b. As shown, the structural support member 122 was positioned on the panels, such that the upper chord 142 bridges the abutting edges 125 of the panels 124a and 124b. A liquid stream of a plural component liquid polymeric resin foam adhesive was then directed from both sides of the structural member, forming a fillet 180a and 180b on opposed sides of the upper chord 142. As described, the foamable resin adhesive is applied while the panels 124a and 124b are flattened against the flat vacuum plate 170. Upon completion of the cure of the foam resin, the abutting edges 125 of the panels are permanently retained in flat coplanar abutting relation, as shown. As described above, this process eliminates the requirement for taping and mudding or batten strips, substantially reducing the cost of the panel assembly or eliminating the requirement for the unsightly batten strips. If a more finished surface is desired, a conventional caulking material may be applied to the finish surfaces of the abutting edges, which may then be trowelled and sanded.

As will be understood, FIGS. 11 to 13 illustrate a preferred embodiment of the method of this invention utilized to form a ceiling assembly. However, this same method may be used to form a wall or floor assembly as shown, for example, at 20 in FIG. 1. The method of this invention may then be used to form an enclosed wall assembly as shown in FIGS. 1 through 7. An enclosed wall assembly of this invention will have substantially perfectly flat parallel walls which may comprise several panels in edge-to-edge abutting coplanar relation. In FIG. 11, for example, the panels may be 4×10 or 12 ft. in length and 15 or more panels may be used in a single ceiling assembly.

As will be understood by those skilled in the art, various modifications may be made to the method of forming structural panel assemblies of this invention and the resultant improved rigid structural panel assembly within the purview of the appended claims. For example, the structural support members 22 may be attached to the first panel 24 by any suitable means, including mechanical fasteners, although the use of foam adhesives has several advantages over the prior art, as described above. Further, although an important advantage of the method of this invention is the elimination of mechanical fasteners, mechanical fasteners may also be used between the finish panel and the structural support members. Finally, although the foam resin bead is preferably applied to the structural members, as described above, it may alternatively be applied first to the finish panel.

We claim:

1. A method of forming a flat relatively rigid panel assembly comprising a plurality of flexible fibrous panels having adjacent side edges generally in abutting edge-to-edge coplanar relation subject to warpage and surface irregularities and a plurality of structural support members, said structural support members each having a generally flat end face also subject to warpage and surface irregularities, and bonded to said panels by a polymeric adhesive, said method comprising the following steps:

(a) orienting said flexible fibrous panels in said generally abutting edge-to-edge relation on a vacuum plate having a plurality of apertures therethrough, drawing a vacuum through said vacuum plate and drawing said flexible fibrous panels flat against said plate thereby reducing any non-planar positions in said panels;

(b) orienting and supporting said structural support members with said generally flat end faces aligned in generally coplanar relation for attachment to said panels, at least one structural support member having an end face bridging said abutting panel side edges of adjacent panels;

(c) adhesively bonding said end faces of said structural support members to said panels by applying a polymeric resin adhesive to said structural support member end faces and said panels while said panels are drawn flat against said vacuum plate, filling gaps formed between said panels and said support members due to warpage or surface irregularities therein with said adhesive, and wetting said panels and said structural support member end faces, said at least one structural support member permanently bonding said panel edges in said abutting edge-to-edge coplanar relation; and (d) allowing said polymeric resin adhesive to cure while retaining said panels flat against said vacuum plate, said structural support members then rigidly supporting said panels in a flattened orientation when said panel assembly is removed from said vacuum table.

2. The method of forming a flat relatively rigid panel assembly as defined in claim 1, wherein said method includes applying a thin bead of a thoroughly mixed foam resin adhesive along said structural support member end faces, then pressing said structural support member end faces having said beads against said panels, wetting said panels and permanently bonding said support members to said panels and forming said relatively rigid panel assembly.

3. The method of forming a flat relatively rigid panel assembly as defined in claim 1, wherein said method includes orienting and supporting said end faces of said structural support members on said panel with said panel located on said vacuum plate, then directing a stream of a liquid foamable polymeric resin adhesive toward the interface between said structural support member end faces and said panel, allowing liquid foamable resin adhesive to cream and rise, wetting said structural members and said panel and filling the spaces between said structural support member end faces and said panel, and then allowing said foam resin adhesive to cure, permanently bonding said structural support members to said panel and permanently rigidly supporting said panel in said flat orientation, then removing said panel assembly from said vacuum plate.

4. The method of forming a flat, relatively rigid panel assembly as recited in claim 1, wherein said polymeric resin adhesive is a liquid foamable polymeric resin adhesive, said method further comprising allowing said liquid foamable polymeric resin adhesive to cream and rise, thereby filling said gaps formed between said panel and said support members.

5. The method of forming a flat, relatively rigid panel assembly as recited in claim 4, wherein said liquid foamable polymeric resin adhesive comprises a liquid polyurethane foamable resin adhesive.

6. A method of forming a flat relatively rigid panel assembly comprising a plurality of generally flat relatively flexible rectangular fibrous panels subject to warpage and surface irregularities oriented in abutting edge-to-edge coplanar relation and a plurality of transverse structural support members, said structural support members having relatively flat end faces adhesively bonded to said panels, reinforcing said panel assembly, said method comprising the following steps:

(a) orienting said panels on a flat vacuum plate in said abutting edge-to-edge relation, drawing a vacuum through said plate and drawings said panels flat against said plate thereby reducing any non-planar portions in said panels;

(b) orienting and supporting said plurality of structural support members with said end faces aligned in generally coplanar relation for attachment to said panels; and (c) adhesively bonding said end faces of said structural support members to said panels by applying a polymeric resin adhesive to said structural support member end faces mad said panels while said panels are drawn flat against said vacuum plate, at least one structural support member having an end face bridging said abutting panel edges of adjacent panels, said polymeric resin adhesive wetting said panels and said structural support member end faces and filling voids formed therebetween due to said warpage or surface irregularities therein, and permanently bonding said structural support members to said panels with said panels retained essentially flat and said abutting edges rigidly supported in abutting, flat and coplanar relation.

7. The method of forming relatively rigid panel assembly as defined in claim 6, wherein said method includes orienting and supporting said end faces of said structural support members on said panels with said panels located on said vacuum plate, then directing a stream of a liquid foamable polymeric resin adhesive to the interface between said structural support members and said panels, and polymeric resin adhesive foaming and expanding to wet said structural support member end faces and said panels, permanently bonding said structural members to said panels as defined.

8. The method of forming a relatively rigid panel assembly as defined in claim 6, wherein said method includes applying a thin bead of a thoroughly mixed two-component foamable resin adhesive axially along said structural support member end faces, allowing said liquid foamable resin adhesive beads to substantially fully cream and rise, forming enlarged foam beads, then pressing said structural support member end faces having said beads against said panels, wetting said panels and permanently bonding said support members to said panels and forming said relatively rigid panel assembly.

9. The method of forming a relatively rigid panel assembly as defined in claim 6, wherein said method includes adhesively bonding a plurality of second panels over said panel assembly to form an enclosed panel assembly including a plurality of parallel panels with said structural support members located therebetween, said structural support members each having a second relatively flat end face parallel to said end faces and said second end faces being generally coplanar, said method including applying a thin bead of a thoroughly mixed two-component liquid polymeric foamable resin adhesive to said structural support member second end faces, allowing said liquid foamable polymeric resin adhesive beads to substantially fully cream and rise, forming a fluid polymeric foam bead on each of said structural support member second faces, then applying and pressing said second panels against said structural support member second end faces prior to curing of said polymeric foam beads tack free, compressing said foam beads and wetting said second panel with liquid foam resin adhesive, permanently bonding said second panels to said structural support member second end faces.

10. The method of forming a flat, relatively rigid panel assembly as recited in claim 6, wherein said polymeric resin adhesive is a liquid foamable polymeric resin adhesive, said method further comprising allowing said liquid foamable polymeric resin adhesive to cream and rise, thereby filling said gaps formed between said panel and said support members.

11. A method of forming a flat relatively rigid panel assembly comprising at least two generally flat relatively flexible rectangular fibrous panels subject to warpage and surface irregularities, and oriented in abutting edge-to-edge coplanar relation and a plurality of transverse structural support members, said structural support members having relatively flat end faces permanently adhesively bonded to said panels, reinforcing said panel assembly, said method comprising the following steps:

(a) orienting said panels on a flat vacuum plate in said abutting edge-to-edge relation, drawing a vacuum through said plate and drawing said panels flat against said plate thereby reducing any non-planar portions in said panels;

(b) orienting and supporting said plurality of structural support members on said panels with said relatively flat end faces supported on said panels, said structural support members including bridging structural support members having end faces bridging said abutting panel edges of adjacent panels; and (c) adhesively bonding said end faces of said structural support members to said panels by directing a thin stream of a polymeric resin adhesive to the interface between said panels and said structural support member end faces supported on said panels while said panels are flattened against said vacuum plate, said polymeric resin adhesive wetting said structural support member and said panels allowing said resin adhesive to cure while retaining said vacuum, permanently bonding said structural support members to said panels with said panels permanently bonded essentially flat and said abutting edges rigidly supported in flat coplanar relation by said bridging support members.

12. The method of forming a relatively rigid panel assembly as defined in claim 11, wherein said method includes adhesively bonding a plurality of second panels over said panel assembly to form an enclosed panel assembly comprising a plurality of parallel panels having said structural support members located therebetween, said structural support members each having a second relatively flat end face generally parallel to said end faces, said second end faces generally coplanar, said method including applying a thin liquid bead of a two-component foam polymeric resin adhesive to said structural support member second end faces, then applying and pressing said second panels to said structural support member second end faces prior to curing of said foam beads tack free, said polymeric resin foam wetting said second panels and permanently bonding said second panels to said structural support members.

13. The method of forming a relatively rigid panel assembly defined in claim 12, wherein said method includes orienting said second panels on a flat vacuum plate in abutting edge-to-edge relation, drawing a vacuum through said vacuum plate, drawing said second panels flat against said vacuum plate, then adhesively bonding said structural members to said second panels while maintaining said vacuum.

14. The method of forming a flat, relatively rigid panel assembly as recited in claim 11, wherein said liquid foamable polymeric resin adhesive comprises a liquid polyurethane foamable resin adhesive.

15. The method of forming a flat, relatively rigid panel assembly as recited in claim 11, wherein said polymeric resin adhesive is a liquid foamable polymeric resin adhesive, said method further comprising allowing said liquid foamable polymeric resin adhesive to cream and rise to wet said structural support member and said panels and fill said gaps formed between said panel and said support members.

16. The method of forming a flat, relatively rigid panel assembly as recited in claim 15, wherein said liquid foamable polymeric resin adhesive comprises a liquid polyurethane foamable resin adhesive.

17. A method of forming a flat relatively rigid panel assembly comprising at least two generally flat relatively flexible rectangular fibrous panels subject to warpage and surface irregularities, said panels being orientated in edge-to-edge coplanar relationship, and there being a plurality of transverse structural support members supporting said panels, said structural support members having relatively flat end faces permanently adhesively bonded to said panels, reinforcing said panel assembly, the method comprising the following steps:

(a) orientating said panels on a flat vacuum plate in edge-to-edge relationship, drawing a vacuum through said plate, drawing said panels flat against said plate, thereby reducing any non-planar portions in said panels (b) adhesively bonding said end faces of said structural support members to said panels while said panels are flattened against said vacuum plate; and (c) attaching said adjacent panels together, while said panels are held on said vacuum plate with a vacuum drawn, such that any discontinuities between edges of adjacent panels are reduced.

18. A method as recited in claim 17, wherein said structural support members are first placed on said panels, then adhesively bonded to said panels.

* * * * *